(12) United States Patent
D'Authier et al.

(10) Patent No.: US 12,370,914 B2
(45) Date of Patent: Jul. 29, 2025

(54) ELECTRICAL SYSTEM FOR A MOTOR VEHICLE

(71) Applicant: VITESCO TECHNOLOGIES GmbH, Regensburg (DE)

(72) Inventors: Roland D'Authier, Biot (FR); Cédric Laurent, Biot (FR); Michel Aussel, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 18/682,079

(22) PCT Filed: Sep. 7, 2022

(86) PCT No.: PCT/EP2022/074877
§ 371 (c)(1),
(2) Date: Feb. 7, 2024

(87) PCT Pub. No.: WO2023/057161
PCT Pub. Date: Apr. 13, 2023

(65) Prior Publication Data
US 2025/0121716 A1    Apr. 17, 2025

(30) Foreign Application Priority Data

Oct. 4, 2021    (FR) ........................ 2110479

(51) Int. Cl.
*B60L 53/52*  (2019.01)
*B60L 53/22*  (2019.01)
*B60L 55/00*  (2019.01)

(52) U.S. Cl.
CPC ............. *B60L 53/22* (2019.02); *B60L 55/00* (2019.02); *B60L 2210/10* (2013.01); *B60L 2210/30* (2013.01); *B60L 2260/40* (2013.01)

(58) Field of Classification Search
None
See application file for complete search history.

(56) References Cited

U.S. PATENT DOCUMENTS

| 2013/0057200 A1* | 3/2013 | Potts | H02J 50/12 |
| | | | 320/107 |
| 2018/0222333 A1 | 8/2018 | Khaligh | |

(Continued)

FOREIGN PATENT DOCUMENTS

| CA | 3041876 A1 | 11/2020 |
| CN | 110649820 A | 1/2020 |

(Continued)

OTHER PUBLICATIONS

International Search Report and Written Opinion of the ISA for PCT/EP2022/074877 mailed Nov. 25, 2022, 15 pages.

*Primary Examiner* — Jared Fureman
*Assistant Examiner* — Aqeel H Bukhari
(74) *Attorney, Agent, or Firm* — NIXON & VANDERHYE (57) ABSTRACT

This relates to an electric system for a motor vehicle, the vehicle including at least one power supply battery, the electric system including an electric charger intended to be connected, on the one hand, to the battery and, on the other hand, to an electric network outside the vehicle supplying an AC voltage or to electric equipment, and a microcontroller, the charger being able to charge the battery from an external electric network or to allow the battery to power the equipment, the charger including a DC-DC voltage converter able to operate in a first operating mode and a second operating mode, the microcontroller is characterized in that it is configured to control the activation of the first operating mode and to control the activation of the second operating mode.

10 Claims, 3 Drawing Sheets

(56) References Cited

U.S. PATENT DOCUMENTS

| | | | |
|---|---|---|---|
| 2020/0106303 A1* | 4/2020 | Thrimawithana | H04B 5/79 |
| 2021/0221249 A1 | 7/2021 | Ge | |
| 2022/0038019 A1* | 2/2022 | Gaona Rosanes | B60L 53/22 |
| 2022/0219553 A1* | 7/2022 | Fu | H02M 3/33573 |
| 2022/0360178 A1* | 11/2022 | Park | H02M 1/4233 |

FOREIGN PATENT DOCUMENTS

| | | |
|---|---|---|
| CN | 112532101 A | 3/2021 |
| FR | 3014260 A1 | 6/2015 |
| FR | 3089076 A1 | 5/2020 |

\* cited by examiner

ELECTRICAL SYSTEM FOR A MOTOR VEHICLE

CROSS-REFERENCE TO RELATED APPLICATIONS

This application is the U.S. national phase of International Application No. PCT/EP2022/074877 filed Sep. 7, 2022 which designated the U.S. and claims priority to FR 2110479 filed Oct. 4, 2021, the entire contents of each of which are hereby incorporated by reference.

TECHNICAL FIELD

The invention relates to the field of electric or hybrid vehicles and more specifically to electric systems for electric or hybrid vehicles comprising an on-board charger and a microcontroller, and to the method implemented by said electric system.

PRIOR ART

In a known manner, an electric or hybrid vehicle comprises a battery able to supply electric power to electric equipment that may or may not be installed in the vehicle and to the electric machine of the vehicle. The voltage at the terminals of the battery is set, for example, to approximately 200 or 400 volts.

The vehicle also comprises an on-board charger, more commonly referred to as OBC (On-Board Charger). The on-board charger is connected, on the one hand, to the battery and, on the other hand, to equipment outside the vehicle or to a power supply network.

When the on-board charger is electrically connected to equipment such as a cooler or a drill, the on-board charger is said to be operating in the mode that is known to a person skilled in the art as "V2L" (Vehicle-to-Load) mode, in which the on-board charger converts the DC voltage supplied by the battery into an AC voltage in order to power various items of electric equipment of the vehicle. Furthermore, when the on-board charger is connected to an electric power supply network, the on-board charger operates in a mode that is known to a person skilled in the art as "V2G" (Vehicle-to-Grid) mode, in which the on-board charger converts the AC voltage supplied by the power supply network into DC voltage in order to recharge the battery.

An on-board charger notably comprises a power factor corrector circuit (PFC), a DC-DC current converter, a smoothing capacitor electrically connected in parallel between the power factor corrector circuit and the current converter, and a microcontroller able to control the power factor corrector circuit.

More specifically, when the on-board charger operates in the V2L mode, the DC-DC converter is able to convert the DC voltage supplied by the battery into another DC voltage value, ranging between approximately 200 and 400 V. The smoothing capacitor allows any residual oscillations in the DC voltage supplied by the DC-DC converter to be eliminated. Finally, the power factor corrector is the element of the on-board charger able to convert the smoothed DC voltage into an AC voltage able to power the equipment connected to the on-board charger.

The microcontroller is notably able to control the power factor corrector circuit in order to define the value of the DC voltage supplied by the power factor between 400 and 800 V as a function of the state of charge of the battery.

The various electronic components of the power factor corrector circuit and of the DC-DC converter and the smoothing capacitor must be adapted to withstand voltages of up to 800 V, in order not to be damaged.

However, when the on-board charger operates in the V2L mode and high power is instantaneously required from the on-board charger in order to power an item of equipment, this causes voltage and current fluctuations in the on-board charger, which can notably create current instabilities in the on-board charger, and notably current brownouts.

Therefore, a solution is needed in order to at least partly overcome these disadvantages.

Disclosure of the Invention

To this end, the invention relates to an electric system for a motor vehicle, the vehicle comprising at least one power supply battery, the electric system comprising an electric charger intended to be connected, on the one hand, to said battery and, on the other hand, to an electric network outside the vehicle supplying an AC voltage or to electric equipment, and a microcontroller, the charger being able to charge the battery from an external electric network or to allow the battery to power said equipment, the charger comprising a DC-DC voltage converter connected, on the one hand, to the battery and able to convert a DC voltage into another DC voltage, said DC-DC voltage converter comprising a first H-bridge, and a second H-bridge, each H-bridge comprising four switches, a first switch being connected between a high point and a midpoint, a second switch being connected between the midpoint and a low point, a third switch being connected between the high point and a second midpoint and a fourth switch being connected between the second midpoint and the low point, the voltage converter also comprising a transformer electrically connecting the first H-bridge and the second H-bridge, each H-bridge being able to operate in:

i) a first operating mode, in which the first switch and the fourth switch are open and closed simultaneously, the second switch and the third switch are open and closed simultaneously in contrast to the first switch and the fourth switch;

ii) a second operating mode, in which the fourth switch is always closed, the third switch is always open, and the first switch and the second switch are alternately open and closed;

the microcontroller is configured to receive the value of the current at the terminals of the battery and comprises a memory zone, which stores a correspondence table representing the current at the terminals of the battery as a function of the voltage at the terminals of the battery and comprising an intermediate zone defining all the combinations of a voltage value at the terminals of the battery and a current value at the terminals of the battery, associated with the first operating mode or the second operating mode, said correspondence table comprising a plurality of thresholds:

a. a first threshold defining the condition for transitioning from the second operating mode to the second operating mode for the received and filtered current variation;

b. a second threshold defining the condition for transitioning from the second operating mode to the first operating mode for the received current variation; and c. a third threshold defining the condition for transitioning from the first operating mode to the second operating mode;

the microcontroller is characterized in that it is configured for:

1. filtering the variation in the received current;
2. controlling, when the converter is operating in the second operating mode, the activation of the first operating mode if:
   i) at least one value of the variation in the filtered current is greater than the first threshold; or
   ii) at least one value of the variation in the received current is greater than the second threshold;
3. activating, when the converter is operating in the first operating mode, the second operating mode if the value of the received current is less than the third threshold.

The electric system only allows the transition from the first operating mode to the second operating mode, or vice versa, if this transition is really necessary: either in the event of a high power demand, or in the event of a limited power demand but over a significantly long time period. In other words, the electric system avoids transitioning from one mode to another at the slightest current demand as a result of connecting an item of equipment to be powered to the charger. In addition, the electric system avoids having to change mode when a current demand is induced by an instability in regulation.

Preferably, the second threshold is greater than the first threshold.

Preferably, the charger of the electric system comprises a power factor corrector circuit able to convert an AC voltage into a DC voltage, said corrector circuit being electrically connected to the converter and also able to be connected to an electric network outside the vehicle supplying an AC voltage or to electric equipment.

Even more preferably, the on-board charger comprises a link capacitor connected between the power factor corrector circuit and the DC-DC voltage converter able to attenuate the residual oscillations of the voltage supplied between the power factor corrector circuit and the DC-DC voltage converter.

Even more preferably, the converter comprises:
a) a transformer comprising a primary winding and a secondary winding, each winding comprising a first terminal and a second terminal;
b) a first resonant circuit comprising a resonant capacitor and a coil connected in series, the resonant capacitor of the first resonant circuit being electrically connected to the first midpoint of the first bridge, and the coil of the first resonant circuit being electrically connected to the first terminal of the primary winding of the transformer;
c) a second resonant circuit comprising a resonant capacitor and a coil connected in series, the resonant capacitor of the second resonant circuit being electrically connected to the first midpoint of the second bridge, and the coil of the second resonant circuit being electrically connected to the first terminal of the secondary winding of the transformer.

Even more preferably, the converter comprises an additional coil, connected in parallel with the primary winding of the transformer. Notably, the additional coil can be inside or outside the transformer. When the additional coil is outside the transformer, the converter corresponds to a resonant DC-DC voltage converter of the CLLLC type.

Advantageously, each switch designates a MOSFET or bipolar transistor.

The invention also relates to a motor vehicle comprising at least one battery and at least one electric system as described above.

The invention also relates to a method for activating and deactivating the first operating mode and the second operating mode of an electric system as described above, the method being characterized in that it comprises the steps of:
a. filtering the variation in the received current;
b. activating, when the converter is operating in the second operating mode, the first operating mode if:
   i. at least one value of the variation in the filtered current is greater than the first threshold; or
   ii. at least one value of the variation in the received current is greater than the second threshold;
c. activating, when the converter is operating in the first operating mode, the second operating mode if the value of the received current is less than the third threshold.

The invention also relates to a computer program product that is characterized in that it comprises a set of program code instructions, which, when they are executed by one or more processors, configure the one or more processors to implement a method as described above.

DESCRIPTION OF THE DRAWINGS

Further features and advantages of the invention will become more clearly apparent from reading the following description. This description is purely illustrative and should be read with reference to the appended drawings, in which.

DESCRIPTION OF THE EMBODIMENTS

Vehicle

An embodiment of the vehicle according to the invention will now be described. The vehicle is notably an electric or hybrid vehicle and notably comprises an electric machine able to convert electric power into mechanical energy in order to set into rotation the wheels of the vehicle. The electric machine therefore corresponds to the electric propulsion motor of the vehicle.

Figure 1:
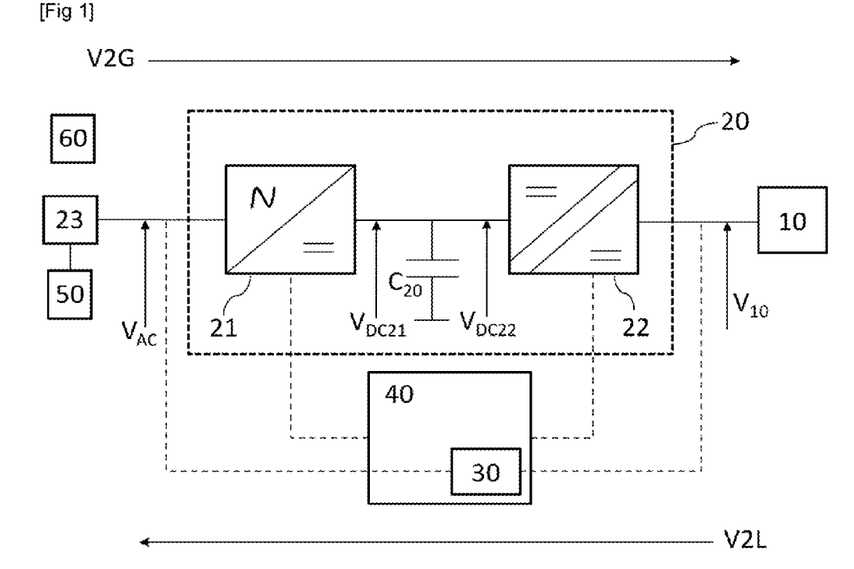
FIG. 1 schematically illustrates the electric system according to the invention.

With reference to FIG. 1, the vehicle also comprises a power supply battery 10 and an electric system comprising an on-board charger 20 and a microcontroller 40.

Battery 10

Notably, the power supply battery 10 is able to operate in a discharge mode, in which the battery 10 supplies energy to equipment installed in the vehicle or to other equipment outside the vehicles that could be connected to the battery 10 or to the electric machine.

The battery 10 is also able to operate in a charge mode, in which the battery 10 is able to charge from electric power supplied by an electric network electrically connected to the battery 10.

For example, the voltage of the battery 10 can be defined between 400 V or 800 V.

Charger 20

The charger 20, better known as the OBC (On-Board Charger), is connected, on the one hand, to the battery 10. On the other hand, the charger 20 comprises a connector 23 able to be connected to an item of equipment 50 that may or may not be outside the vehicle, or to an electric power supply network 60 outside the vehicle able to supply an AC voltage.

The charger 20 is referred to as "bidirectional". Indeed, when the charger 20 is connected to an electric network 60 and the battery is operating according to the state of charge, the charger 20 operates in a "V2G" (Vehicle to Grid) mode, in which the on-board charger 20 is able to convert the AC voltage supplied by the electric network 60 into a DC voltage able to charge the battery 10.

Moreover, when an item of equipment 50 is connected to the charger 20, the battery 10 operates according to the state of discharge, the charger 20 operates in a "V2L" (Vehicle to Load) mode, and is able to convert the DC voltage supplied by the battery 10 into an AC voltage able to power the equipment 50.

More specifically, the charger 20 comprises a power factor corrector circuit 21, a DC-DC voltage converter 22 and a link capacitor $C_{20}$. The converter 22 is electrically connected to the corrector circuit 21 via a wired link. In addition, the link capacitor $C_{20}$ is connected on a branch on the wired link connecting the corrector circuit 21 and the converter 22.

In addition, the converter 22 is adapted to be electrically connected to the battery 10 and the power factor corrector circuit 21 is adapted to be electrically connected to an item of equipment 50 of the vehicle or outside the vehicle or to an electric network 60.

Corrector Circuit 21

Still with reference to FIG. 1, the power factor corrector circuit 21 is able to convert an AC voltage $V_{AC}$ into a DC voltage $V_{DC21}$, and vice versa.

Converter 22

The DC-DC voltage converter 22 is able to convert a DC voltage $V_{DC22}$ into another DC voltage $V_{10}$. The conversion ratio between the DC voltage $V_{DC22}$ and the DC voltage $V_{10}$ is variable and is notably defined by a value within a range defined between 0.4 and 1.3.

Link Capacitor $C_{20}$

The link capacitor $C_{20}$ is able to attenuate the residual oscillations of the DC voltage supplied between the power factor corrector circuit 21 and the DC-DC voltage converter 22.

For example, when the battery 10 is operating in the charge mode, the corrector circuit 21 is connected to an electric network 60. Thus, the corrector circuit 21 converts the AC voltage supplied by the electric network 60 into a DC voltage $V_{DC21}$ substantially defined at 400 V. However, the DC voltage $V_{DC21}$ has an AC portion, in other words the DC voltage $V_{DC21}$ has residual oscillations, for example, of plus or minus 30 V. The link capacitor $C_{20}$ allows the residual oscillations of the DC voltage $V_{DC21}$ to be eliminated. Finally, the converter 22 converts the DC voltage $V_{DC22}$ without residual oscillations into a DC voltage $V_{10}$ suitable for recharging the battery 10, for example, a DC voltage between 220 V and 465 V.

Conversely, when the battery 10 is operating in the discharge mode, then this means that the corrector circuit 21 is connected to an item of electronic equipment 50 to be powered. The converter 22 converts the DC voltage $V_{10}$ supplied by the battery 10 into another DC voltage $V_{DC22}$, for example, approximately equal to 400 V. The DC voltage $V_{DC22}$ supplied by the converter 22 has an alternating portion, in other words, the DC voltage $V_{DC22}$ has residual oscillations, for example, of plus or minus 30 V. The link capacitor $C_{20}$ allows the residual oscillations of the DC voltage $V_{DC22}$ to be eliminated. Finally, the corrector circuit 21 converts the DC voltage $V_{DC21}$ without residual oscillations substantially defined at 400 V into an AC voltage able to supply electric power to the equipment 50 connected to said corrector circuit 21.

Thus, the value of the maximum DC voltage applied across the terminals of the link capacitor $C_{20}$ is substantially equal to or close to 400 V. The nominal voltage of the link capacitor $C_{20}$ is selected as a function of this DC voltage constraint. Notably, the link capacitor $C_{20}$ has a nominal voltage at least greater than the maximum DC voltage applied thereto. Preferably, the link capacitor $C_{20}$ has a nominal voltage slightly higher than the maximum DC voltage applied thereto. Thus, since the nominal voltage of the link capacitor $C_{20}$ and the value of the maximum DC voltage applied thereto are close, the capacitor $C_{20}$ is not under-utilized and is able to fully discharge or charge.

The detailed electronic structure of the converter 22 will now be described. The converter 22 corresponds to a CLLC or CLLLC resonant DC-DC voltage converter.

Figure 2:
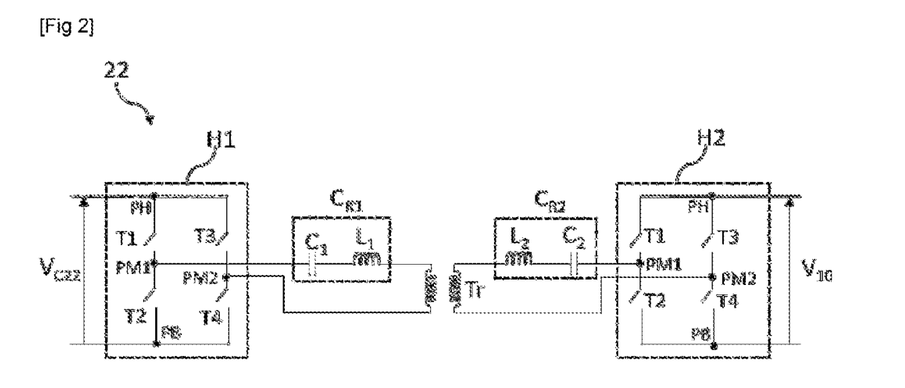
FIG. 2 shows the electronic circuit of the charger converter of the electric system according to FIG. 1.

With reference to FIG. 2, the converter 22 corresponds to a CLLC resonant DC-DC voltage converter and comprises a transformer Tr, a first H-bridge, designated H1 in FIG. 2, a second H-bridge, designated H2, in FIG. 2, a first resonant circuit CR1 and a second resonant circuit CR2.

The transformer Tr comprises a primary winding and a secondary winding, each winding comprising a first terminal and a second terminal.

Each bridge H1, H2 comprises four switches, a first switch T1 being connected between a high point PH and a midpoint PM1, a second switch T2 being connected between the midpoint PM1 and a low point PB, a third switch T3 being connected between the high point PH and a second midpoint PM2 and a fourth switch T4 being connected between the second midpoint PM2 and the low point PB.

The switches T1, T2, T3, T4 can designate any type of switch, and notably, MOSFET or bipolar transistors.

The first resonant circuit CR1 comprises a resonant capacitor C1 and a coil L1 connected in series. By analogy, the second resonant circuit CR2 comprises a resonant capacitor C2 and a coil L2 connected in series.

The resonant capacitor C1 of the first resonant circuit CR1 is electrically connected to the first midpoint PM1 of the first bridge H1, and the coil L1 of the first resonant circuit CR1 is electrically connected to the first terminal of the primary winding of the transformer Tr.

The second terminal of the primary winding of the transformer Tr is electrically connected to the second midpoint PM2 of the first bridge H1.

The resonant capacitor C2 of the second resonant circuit CR2 is electrically connected to the first midpoint PM1 of the second bridge H2, and the coil L2 of the second resonant circuit CR2 is electrically connected to the first terminal of the secondary winding of the transformer Tr.

The second terminal of the secondary winding of the transformer Tr is electrically connected to the second midpoint PM2 of the second bridge H2.

For example, the transformer Tr is able to supply an output voltage between the terminals of the secondary winding that is equal to the voltage applied between the terminals of the first winding. This ratio of 1 between the output voltage and the voltage applied across the terminals of the first winding can be modified.

The converter 22 also comprises an additional coil (not shown in the figures) in parallel with the primary winding of the transformer Tr. The additional coil can be inside or outside the transformer Tr. When the additional coil is outside the transformer Tr, the converter 22 corresponds to a resonant DC-DC voltage converter of the CLLLC type.

H-Bridge Operating Mode

The first bridge H1, respectively the second bridge H2, is also able to operate in a first operating mode, in which the first switch T1 and the fourth switch T4 are open and closed simultaneously. Furthermore, in the first operating mode, the second switch T2 and the third switch T3 are opened and closed simultaneously, unlike the first switch T1 and the fourth switch T4. The first operating mode is known to a person skilled in the art as "Full-Bridge".

The first bridge H1, respectively the second bridge H2, is able to operate in a second operating mode, in which the fourth switch T4 is always closed, the third switch T3 is always open, and the first switch T1 and the second switch T2 are alternately open. The second operating mode is known to a person skilled in the art as "Half-Bridge".

Notably, the second operating mode allows the voltage gain of the converter 22 to be reduced compared with the voltage gain of the converter 22 when it is operating in the first operating mode.

Microcontroller 40

The microcontroller 40 is connected to the charger 20.

The microcontroller 40 comprises a controller 30 and more specifically a PID (Proportional-Integral-Derivative) controller. In the present case, the controller 30 is able to obtain the value of the DC voltage $V_{10}$ measured between the converter 22 and the battery 10. Similarly, the controller 30 is able to obtain the value of the voltage $V_{AC}$ measured between the corrector circuit 21 and the electric equipment 50 (or the electric network 60) connected to said corrector circuit 21.

The controller 30 is also adapted to receive the voltage setpoint to be applied between the converter 22 and the battery 10 and/or the voltage setpoint to be applied between the corrector circuit 21 and the electric equipment 50 connected to said corrector circuit 21.

The controller 30 is able to determine whether each measured value corresponds to the received voltage setpoint to be applied.

In addition, when a measured value does not correspond to the corresponding setpoint value, the controller 30 is configured to issue at least one instruction to the microcontroller 40 in order to modify the conversion ratio of the converter 22, so that each measured value corresponds to the corresponding setpoint. The instruction issued by the controller 30 notably includes a control frequency value.

The controller 30 is also able to measure the current at the terminals of the battery 10.

Microcontroller 40

The microcontroller 40 is able to periodically receive the value of the current at the terminals of the battery 10 measured by the controller 30.

The microcontroller 40 is able to control the converter 22. More specifically, the microcontroller 40 is able to control the opening and closing of each switch T1, T2, T3, T4 of the first bridge H1 and of the second bridge H2. Thus, the microcontroller 40 is able to control the activation and deactivation of the first operating mode and the activation and deactivation of the second operating mode of the first bridge H1 and of the second bridge H2.

Even more specifically, the microcontroller 40 is able to control the opening and closing of each switch T1, T2, T3, T4 of the first bridge H1 and of the second bridge H2, notably using the frequency modulation method. To this end, the microcontroller 40 sends a control signal to each switch T1, T2, T3, T4. Each control signal is defined by a periodic square-wave signal, the duty cycle of which is notably 50%. In other words, the control signal relating to a switch T1, T2, T3, T4 alternates between a "high" state enabling closure of said switch to be controlled, and a "low" state enabling opening of said switch to be controlled. The opposite also can be the case, the high state can control the opening of said switch and the low state can control the closure of said switch.

Each control signal is therefore characterized by a frequency. More specifically, a first range of frequencies defines the set of frequencies of the control signal (and therefore the set of opening and closing frequencies of the switches T1, T2, T3, T4) for which the first bridge H1 or the second bridge H2 operates in the first operating mode. Similarly, a second frequency range defines the set of frequencies of the control signal (and therefore the set of opening and closing frequencies of the switches T1, T2, T3, T4) for which the first bridge H1 or the second bridge H2 operates in the second operating mode. Thus, when the microcontroller 40 activates the first operating mode, respectively the second operating mode, of the first bridge H1 or of the second bridge H2, the microcontroller 40 defines the frequency of each control signal sent to the switches T1, T2, T3, T4 of said bridge by selecting a value from among the first, respectively the second, frequency range.

In order to operate the V2G mode of the charger 20, the microcontroller 40 controls the switches T1, T2, T3, T4 of the first bridge H1 so that the first bridge H1 operates in the first operating mode or the second operating mode and the switches T1, T2, T3, T4 of the second bridge H2 so that the second bridge H2 operates as a rectifier bridge.

In order to implement the V2L mode of the charger 20, the microcontroller 40 controls the switches T1, T2, T3, T4 of the second bridge H2 so that the second bridge H2 operates in the first operating mode or the second operating mode, and the switches T1, T2, T3, T4 of the first bridge H1 so that said first bridge operates as a rectifier bridge.

Thus, the microcontroller 40 is able to control the activation and deactivation of the first operating mode and the activation and deactivation of the second operating mode of the first bridge H1 and of the second bridge H2.

The microcontroller 40 is also able to receive the value of the current at the terminals of the battery 10 and the voltage at the terminals of the battery 10. The microcontroller 40 therefore receives the variation in the current at the terminals of the battery 10.

Figure 4:
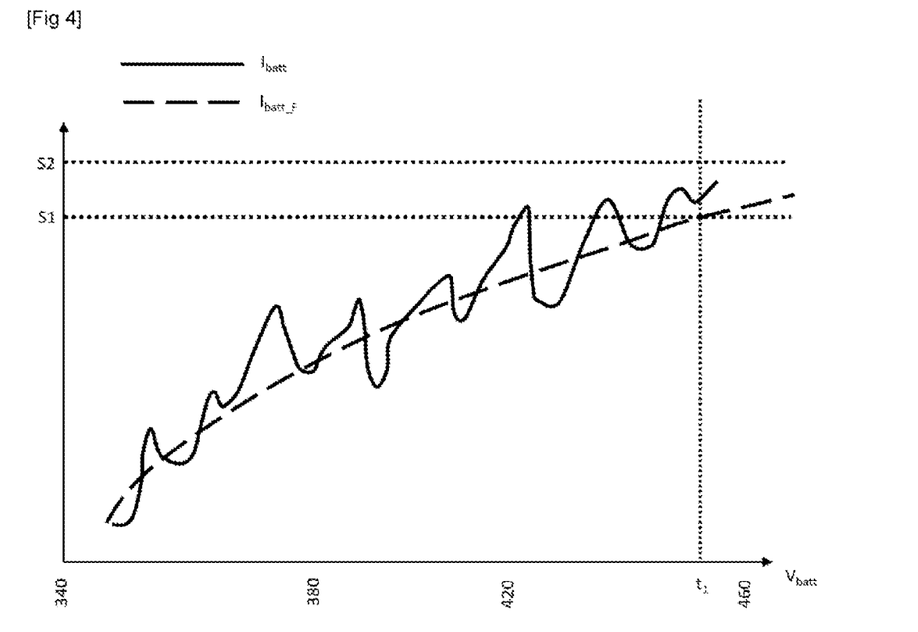
FIG. 4 shows a first example of the variation in the current received by the microcontroller and the variation in the current received and filtered by the microcontroller as a function of the voltage at the battery terminals, and of the first and second thresholds according to the invention.
Figure 5:
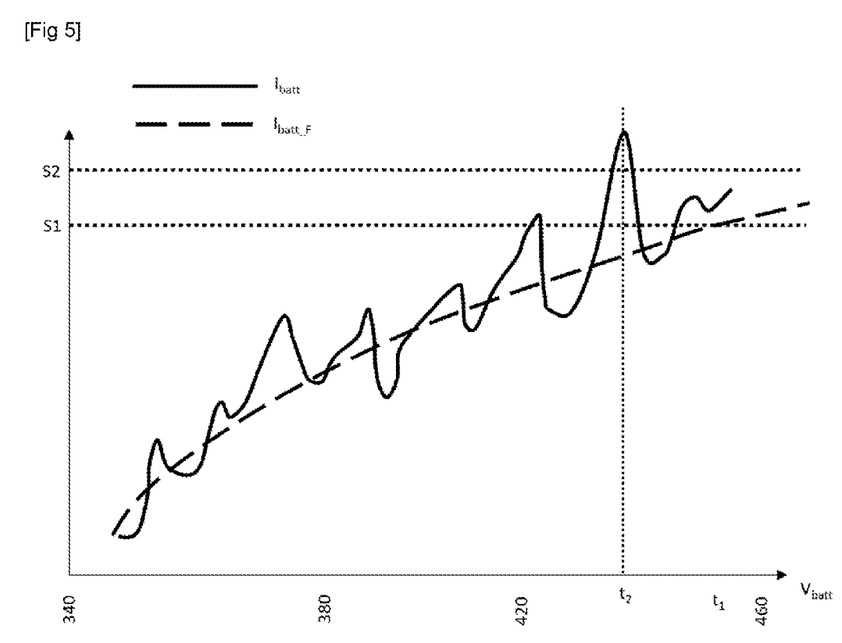
FIG. 5 shows a second example of the variation in the current received by the microcontroller and the variation in the current received and filtered by the microcontroller as a function of the voltage at the battery terminals, and the first and second thresholds according to the invention.

The microcontroller 40 is also configured to filter the variation in the received current. This notably allows any current peaks to be attenuated. The filter is, for example, a "low-pass" filter with a cut-off frequency, for example, of the order of 10 Hz. With reference to FIGS. 4 and 5, the variation in the received current $I_{batt}$ and the variation in the filtered received current $I_{batt\_F}$ are shown as a function of the voltage variation $V_{batt}$ in the battery 10.

When the converter 22 is operating in the second operating mode and an item of equipment 50 is connected to the connector 23 of the charger 20, the microcontroller 40 is able to determine the need to change the operating mode of the H-bridge of the converter 22.

Figure 3:
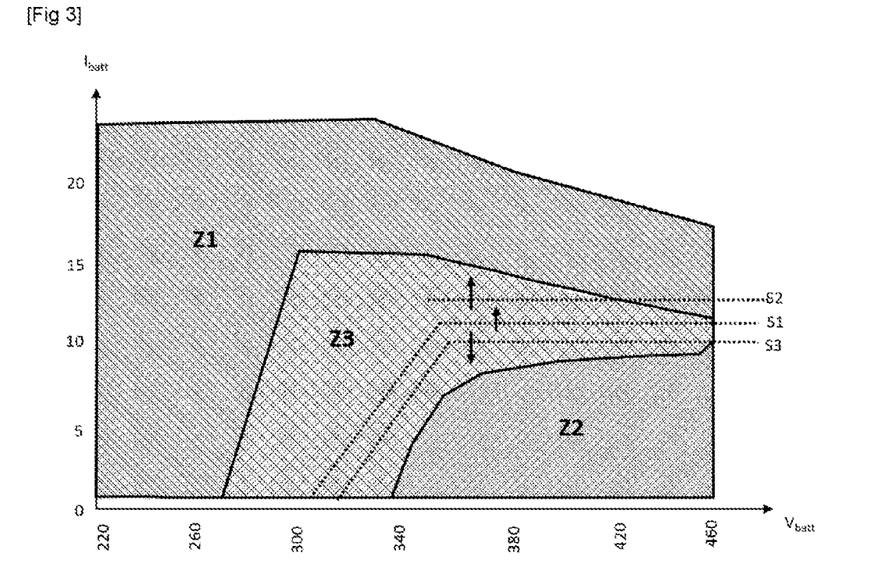
FIG. 3 shows the correspondence table according to the invention.

To this end, with reference to FIG. 3, the microcontroller 40 also comprises a memory zone (not shown in the figures) that stores a correspondence table representing the current $I_{batt}$ at the terminals of the battery 10 as a function of the voltage at the terminals of the battery $V_{batt}$ and comprising:
- a first zone Z1 defining all the combinations of a voltage value at the terminals of the battery 10 and a current value at the terminals of the battery 10, solely associated with the first operating mode;
- a second zone Z2 defining all the combinations of a voltage value at the terminals of the battery 10 and a current value at the terminals of the battery 10, solely associated with the second operating mode;
- an intermediate zone Z3, connecting the first zone Z1 and the second zone Z2 and defining all the combinations of a voltage value at the terminals of the battery 10 and a current value at the terminals of the battery 10, associated with the first operating mode or the second operating mode.

The intermediate zone Z3 comprises a plurality of thresholds: a first threshold S1, a second threshold S2 and a third threshold S3.

The first threshold S1 defines the condition for transitioning from the second operating mode HB to the first operating mode FB for the variation in the filtered current.

The first threshold S1 is defined by a linear portion and then by a constant portion.

Notably, the linear portion $I_{S1}$ of the first threshold S1 is defined by the following equation:

$$I_{S1} = a_{S1} * V_{BATT} + b_{S1} \text{ with } \begin{cases} a_{S1} = 0.1 \\ b_{S1} = -29.5 \end{cases}$$

Notably, the constant portion is defined by the thermal performance of the converter 22. Notably, this value ranges, for example, between 10 and 15 A, preferably it is 11 A, for a 7 KW single-phase charger.

The second threshold S2 defines the condition for transitioning from the second operating mode HB to the first operating mode FB for the variation in the unfiltered current.

The second threshold S2 is defined by a constant value greater than the value defining the constant portion of the first threshold S1. For example, the second threshold is 12.5 A.

The third threshold S3 defines the condition for transitioning from the first operating mode FB to the second operating mode HB. The third threshold S3 is defined by a linear portion and then by a constant portion. Preferably, the third threshold S3 is less than the first threshold S1.

Notably, the linear portion $I_{S3}$ of the third threshold S3 is defined by the following equation:

$$I_{S3} = a_{S3} * V_{BATT} + b_{S3} \text{ with } \begin{cases} a_{S3} = 0.1 \\ b_{S3} = -31 \end{cases}$$

Notably, the constant portion is defined by the thermal performance of the converter 22. Notably, this value ranges, for example, between 10 and 15, preferably it is 10 A.

The microcontroller 40 comprises a processor able to implement a set of instructions that allows these functions to be performed.

Method

Figure 6:
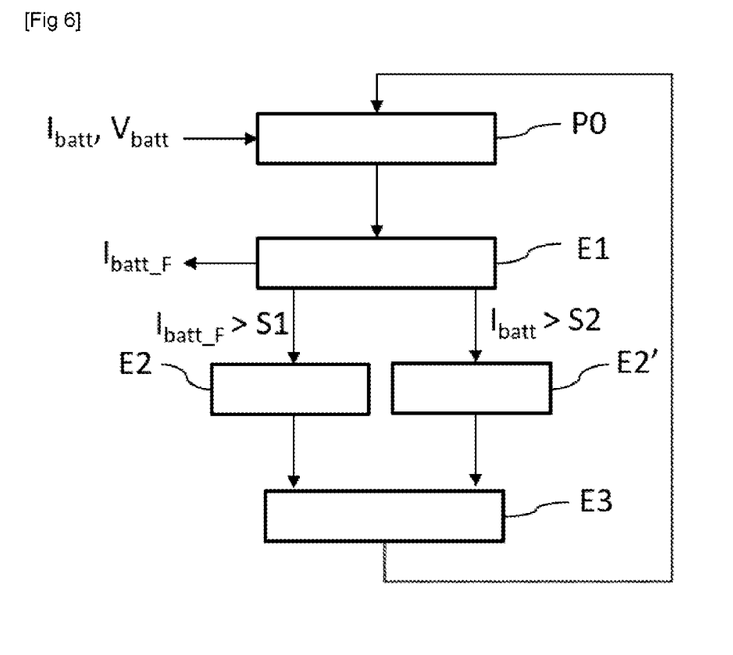
FIG. 6 schematically illustrates the method according to the invention.

With reference to FIG. 6, an embodiment of the method for activating the first or second operating mode will now be described. To describe the method, the case whereby an item of equipment 50 is electrically connected to the charger 20 (and therefore the charger 20 is operating in the V2L mode) will be considered first.

The method firstly comprises a phase P0 for periodically receiving, by the microcontroller 40, the value of the current measured at the terminals of the battery 10 by the controller 30, and the value of the voltage measured at the terminals of the battery 10. The microcontroller 40 thus receives the variation in the current measured at the terminals of the battery 10.

The method also comprises a step E1 of the microcontroller 40 filtering the variation in the received current.

The method comprises a step E2 of activating the first operating mode of the second bridge H2 of the converter 22, when at least one value of the variation in the filtered current is greater than the first threshold S1. For example, with reference to FIG. 4, at the time $t_1$, the first operating mode is activated, since the variation in the filtered current $I_{batt\_F}$ is greater than the first threshold S1. The method thus allows the first operating mode to be activated when the variation in the filtered current $I_{batt\_F}$, representing the demand for the supply of current to the battery 10, has progressively increased until it is greater than the first threshold S1.

The method comprises a step E2' of activating the first operating mode of the second bridge H2 of the converter 20, when at least one value of the received variation in the (unfiltered) current is greater than the second threshold S2. For example, with reference to FIG. 5, at the time $t_2$, the first operating mode is activated, since the variation in the (unfiltered) current $I_{batt}$ is greater than the second threshold S2. The second threshold S2 thus allows the first operating mode to be activated when the variation in the current $I_{batt}$, representing the current demand to be supplied by the battery 10, significantly increases over a relatively short time period.

In this way, the voltage supplied by the charger 20 to the connector 23 increases, allowing the equipment 50 to be supplied rapidly. The method thus allows the voltage supplied by the charger 20 to be adapted if an item of equipment 50 is connected to said charger 20.

Conversely, when the converter 22 is operating in the first operating mode FB and the equipment 50 is disconnected from the charger 20, the method comprises a step E3 of activating the second operating mode of the second bridge H2 of the converter 20, when the value of the received current is less than the third threshold S3.

In this way, the voltage supplied by the charger 20 to the connector 23 decreases. As the equipment 50 has been disconnected from the connector 23, it is no longer necessary for the charger 20 to supply a high voltage for powering the equipment 50. The method thus allows the voltage supplied by the charger 20 to be adapted if an item of equipment 50 is connected to the charger 20 or is disconnected from the charger 20.

The method also can be implemented in a similar manner when the electric network 60 is electrically connected to the charger 20 (and therefore the charger 20 is operating in the V2G mode). However, in this case, the control signal will not be sent to the switches T1, T2, T3, T4 of the second bridge H2, but to the switches of the first bridge H1.

The invention claimed is:

1. An electric system for a motor vehicle, the vehicle comprising at least one power supply battery, the electric system comprising an electric charger intended to be connected both to said battery and also to an electric network outside the vehicle supplying an AC voltage or to electric equipment, and a microcontroller, the charger being able to charge the battery from an external electric network or to allow the battery to power said equipment, the charger comprising a DC-DC voltage converter connected, on the one hand, to the battery and able to convert a DC voltage into another DC voltage, said DC-DC voltage converter comprising a first H-bridge, and a second H-bridge, each H-bridge comprising four switches, a first switch being connected between a high point and a midpoint, a second switch being connected between the midpoint and a low point, a third switch being connected between the high point and a second midpoint and a fourth switch being connected between the second midpoint and the low point, the voltage converter also comprising a transformer electrically connecting the first H-bridge and the second H-bridge, each H-bridge being able to operate in:
   i) a first operating mode, in which the first switch and the fourth switch are open and closed simultaneously, the second switch and the third switch are open and closed simultaneously in contrast to the first switch and the fourth switch;
   ii) a second operating mode, in which the fourth switch is always closed, the third switch is always open, and the first switch and the second switch are alternately open and closed;

the microcontroller is configured to receive the value of the current at the terminals of the battery and comprises a memory zone, which stores a correspondence table representing the current at the terminals of the battery as a function of the voltage at the terminals of the battery and comprising an intermediate zone, defining all the combinations of a voltage value at the terminals of the battery and a current value at the terminals of the battery, associated with the first operating mode or the second operating mode, said correspondence table comprising a plurality of thresholds:
   a. a first threshold defining the condition for transitioning from the second operating mode to the second operating mode for the received and filtered current variation;
   b. a second threshold defining the condition for transitioning from the second operating mode to the first operating mode for the received current variation;
   c. a third threshold defining the condition for transitioning from the first operating mode to the second operating mode;

the microcontroller being configured for:
   1. Filtering the variation in the received current;
   2. Controlling, when the converter is operating in the second operating mode, the activation of the first operating mode if:
      iii) at least one value of the variation in the filtered current is greater than the first threshold; or
      iv) at least one value of the variation in the received current is greater than the second threshold;
   3. When the converter is operating in the first operating mode: controlling the activation of the second operating mode if the value of the received current is less than the third threshold.

2. The electric system as claimed in claim 1, wherein the second threshold is greater than the first threshold.

3. The electric system as claimed in claim 1, wherein the charger comprises a power factor corrector circuit able to convert an AC voltage into a DC voltage, said corrector circuit being electrically connected to the converter and also able to be connected to an electric network outside the vehicle supplying an AC voltage or to electric equipment.

4. The electric system as claimed in claim 3, wherein the on-board charger comprises a link capacitor connected between the power factor corrector circuit and the DC-DC voltage converter able to attenuate the residual oscillations of the voltage supplied between the power factor corrector circuit and the DC-DC voltage converter.

5. The electric system as claimed in claim 4, wherein the converter comprises:
   a) a transformer comprising a primary winding and a secondary winding, each winding comprising a first terminal and a second terminal;
   b) a first resonant circuit comprising a resonant capacitor and a coil connected in series, the resonant capacitor of the first resonant circuit being electrically connected to the first midpoint of the first bridge, and the coil of the first resonant circuit being electrically connected to the first terminal of the primary winding of the transformer;
   c) a second resonant circuit comprising a resonant capacitor and a coil connected in series, the resonant capacitor of the second resonant circuit being electrically connected to the first midpoint of the second bridge, and the coil of the second resonant circuit being electrically connected to the first terminal of the secondary winding of the transformer.

6. The electric system as claimed in claim 5, wherein the converter comprises an additional coil, connected in parallel with the primary winding of the transformer.

7. The electric system as claimed in claim 1, wherein each switch designates a MOSFET or bipolar transistor.

8. A motor vehicle comprising at least one battery and at least one electric system as claimed in claim 1.

9. A method for activating and deactivating the first operating mode and the second operating mode of an electric system as claimed in claim 1, the method comprising:
   a) filtering the variation in the received current;
   b) activating, when the converter is operating in the second operating mode, the first operating mode if:
      i) at least one value of the variation in the filtered current is greater than the first threshold; or
      ii) at least one value of the variation in the received current is greater than the second threshold;
   c) activating, when the converter is operating in the first operating mode, the second operating mode if the value of the received current is less than the third threshold.

10. A non-transitory computer-readable medium on which is stored a set of program code instructions, which, when executed by one or more processors, configure the one or more processors to implement the method as claimed in claim 9.

* * * * *